(12) United States Patent
Sano et al.

(10) Patent No.: US 8,279,373 B2
(45) Date of Patent: Oct. 2, 2012

(54) LIQUID CRYSTAL MODULE AND ELECTRONIC DEVICE

(75) Inventors: Motonori Sano, Tokyo (JP); Kouichiro Takashima, Tokyo (JP)

(73) Assignee: Sony Mobile Communications AB, Lund (SE)

( * ) Notice: Subject to any disclaimer, the term of this patent is extended or adjusted under 35 U.S.C. 154(b) by 149 days.

(21) Appl. No.: 12/821,474

(22) Filed: Jun. 23, 2010

(65) Prior Publication Data

US 2011/0116013 A1 May 19, 2011

(30) Foreign Application Priority Data

Nov. 13, 2009 (JP) ................................. 2009-259506

(51) Int. Cl.
*G02F 1/1335* (2006.01)
(52) U.S. Cl. ................. 349/65; 349/62; 349/66; 349/69
(58) Field of Classification Search ............... 349/62–69
See application file for complete search history.

(56) References Cited

U.S. PATENT DOCUMENTS

| | | | |
|---|---|---|---|
| 2003/0063235 A1 | 4/2003 | Nakaoka et al. | |
| 2003/0099116 A1 | 5/2003 | Nousiainen | |
| 2004/0212981 A1 | 10/2004 | Wang et al. | |
| 2005/0041009 A1 | 2/2005 | Kuroda | |
| 2009/0256996 A1 | 10/2009 | Suzuki | |

FOREIGN PATENT DOCUMENTS

| | | |
|---|---|---|
| EP | 1 510 994 A1 | 3/2005 |
| EP | 1 832 806 A1 | 9/2007 |
| JP | 5-100118 | 4/1993 |

OTHER PUBLICATIONS

Extended European Search Report issued Feb. 10, 2011 in corresponding European Application No. 10 16 7415.

*Primary Examiner* — Phu Vu (74) *Attorney, Agent, or Firm* — Oblon, Spivak, McClelland, Maier & Neustadt, L.L.P.

(57) ABSTRACT

A liquid crystal module according to an embodiment of the present invention includes a liquid crystal panel, a transparent panel member configured to include a display section constituting a display image plane while overlapping the liquid crystal panel, and a step section connected to the display section and lower than an image plane position by one step, at least one light source disposed in the step section of the transparent panel member, and a diffusion mechanism provided in a part other than the display image plane of the display section and a face opposite thereto, and diffusing light from the light source.

11 Claims, 15 Drawing Sheets

LIQUID CRYSTAL MODULE AND ELECTRONIC DEVICE

BACKGROUND OF THE INVENTION

1. Field of the Invention

The present invention relates to a liquid crystal module constituting a so-called transparent display, and an electronic device using the same.

2. Description of the Related Art

In recent years, a liquid crystal display (LCD) using a liquid crystal ("LC") panel has been widely used as a flat panel type display device. The LC panel performs display by partially blocking or transmitting light from a light source or external light by the use of LC composites.

When a backlight is used as a light source for illuminating the display device, the light from the light source is guided to an opaque light diffusion plate disposed on its rear face, whereby the light can be diffused and uniformly illuminate the whole display device from the rear face (refer to Japanese Unexamined Patent Application Publication No. H5-100118 which is an example of related art). This opaque diffusion plate can effectively diffuse the light and therefore prevent a light unevenness, for example, only the light source is seen bright, or only a portion of the display device is bright or dark.

SUMMARY OF THE INVENTION

Meanwhile, in recent years, a so-called transparent display has been developed in which information is displayed on a display device at the time of display-ON, and a rear face of the display device is seen through at the time of display-OFF. Of these transparent displays, one using polymer dispersed LC (polymer network LC) is practically put to use. The polymer dispersed LC has characteristics that incident light is scattered in the state where a voltage is not applied thereto, and the incident light is passed as it is in the state where a voltage is applied thereto.

In this transparent display, its display is easily seen since incident light is easily significantly scattered at a place such as outdoors or the like where an external light is strong. However, a light diffusion is not sufficiently made in the transparent display, and thus a light unevenness easily happens. Especially, an incident light is seldom scattered in a dark environment, and thereby there is a problem that it is difficult to see information displayed on its screen.

If the information is intended to be seen easily even in a dark environment in the transparent display using the polymer dispersed LC, it can be achieved by illumination using the typical backlight as described above or a front light. However, if the opaque diffusion plate is arranged in the rear face of the display, the transparent display may not be implemented.

For this reason, the opaque diffusion plate may not be used in either the front face or the rear face of the display device.

It is desirable to provide reduction of a light unevenness of an image plane due to a light source, using a relatively simple means, without degrading functions of the transparent display.

A liquid crystal module according to an embodiment of the present invention includes a liquid crystal panel, a transparent panel member configured to include a display section constituting a display image plane while overlapping the liquid crystal panel, and a step section connected to the display section and lower than an image plane position by one step; at least one light source disposed in the step section of the transparent panel member; and a diffusion mechanism provided in a part other than the display image plane of the display section and a face opposite thereto, and diffusing light from the light source.

When the light source is disposed in the step section lower than the image plane by one step, it is convenient to arrange members for hiding the light source. A light unevenness caused by this step section is reduced by light diffusion owing to the diffusion mechanism. This diffusion mechanism is provided at places other than the display image plane of the display section and the face opposite thereto, and thus, at the time of working as the transparent display, its functions are not damaged.

Detailed examples of the diffusion mechanism are described in the following embodiments.

An electronic device according to an embodiment of the present invention adopts the liquid crystal module as a display device, wherein a rear face area of the housing corresponding to the display section is transparent or empty.

According to the present invention, the functions of the transparent display are not damaged by principally considering a surface state or a shape of the light guide plate, and thus a light unevenness of the image plane due to the light source can be reduced.

BRIEF DESCRIPTION OF THE DRAWINGS

FIG. 1 is a diagram illustrating an appearance of a portable telephone terminal which is an example of an electronic device according to an embodiment of the present invention, in which

FIG. 2 is a diagram illustrating a transparent display, in which

FIG. 7 is a diagram illustrating a first embodiment of the present invention, in which

FIG. 9 is a diagram illustrating a second embodiment of the present invention, in which

FIG. 11 is a diagram illustrating a third embodiment of the present invention, in which

DESCRIPTION OF THE PREFERRED EMBODIMENTS

Exemplary embodiments of the present invention will now be described in detail with reference to the drawings.

Figure 1A:
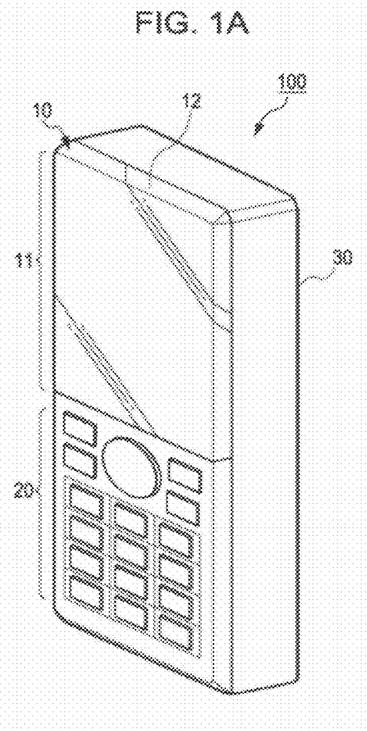
FIG. 1A is a perspective view where a front face side is seen.
Figure 1B:
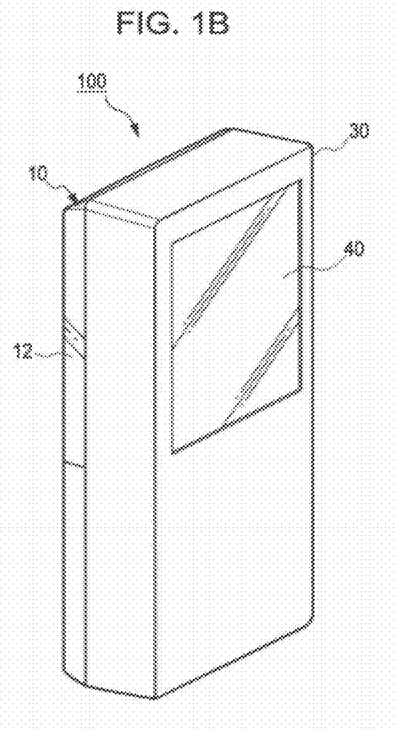
FIG. 1B is a perspective view where a rear face side is seen.

FIG. 1 shows an appearance of a portable telephone terminal 100 which is an example of an electronic device according to an embodiment of the present invention. FIG. 1A is a perspective view where a front face side is seen, and FIG. 1B is a perspective view where a rear face side is seen.

The portable telephone terminal (hereinafter, simply referred to as a "terminal") 100 is a so-called straight type terminal, and is provided with a liquid crystal ("LC") module 10 in the front face side of a housing 30 and an operation section 20 in its lower part. A light guide plate 12, constituting a portion of the LC module 10, which is a transparent panel member, includes a display section 11 which constitutes a display image plane while overlapping an LC panel (not shown in FIG. 1) placed in the back thereof. A material of the light guide plate 12 may adopt, for example, synthetic resin such as acryl, or glass, or the like. The light guide plate 12 includes a step section 13 (hidden in the back of the operation section 20 in FIG. 1). This step section 13 is connected to the display section 11, and has a surface which is lower than an image plane position by one step. This light guide plate 12 guides light emitted from a light source described later, to the whole image plane, in this embodiment.

The LC panel of the terminal 100 has a transparent window section 40 in the rear face area of the housing corresponding to the display section 11. Thereby, there is a constitution of the transparent display which can make the other side seen through by passing through the display image plane, according to the display state of the LC panel placed in the back of the light guide plate 12. The LC panel in this embodiment uses a polymer dispersed LC. The window section 40 may be empty, or may be constituted by a transparent panel member like the light guide plate 12. Although not shown in the figure, for example, when the image plane is seen in the state where a palm or fingers are put behind the terminal and the terminal is supported, the palm or the fingers are seen through gaps between images.

Figure 2A:
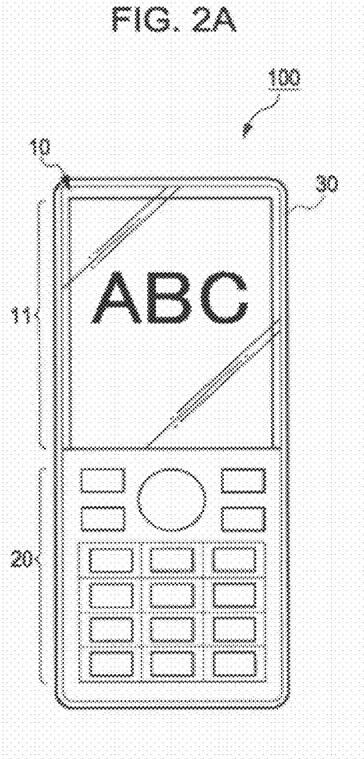
FIG. 2A is a front view of the terminal.
Figure 2B:
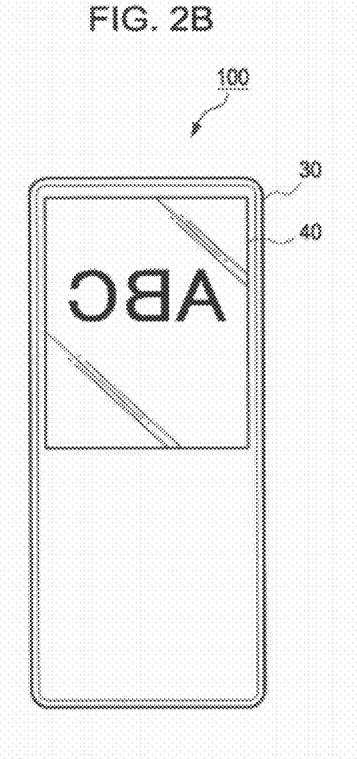
FIG. 2B is a rear view thereof.

Also, as shown in FIGS. 2A and 2B, the image displayed on the display section 11 placed on the surface side of the terminal 100 can be seen as a bilaterally symmetric mirror image from the window section 40 in the rear side.

Description of this embodiment will be made following description of various kinds of light unevenness, that is, a transverse unevenness, a longitudinal line, and a source light unevenness. This embodiment will be described in the premise of a front light which illuminates the LC panel from the front face side of the LC panel. However, the present invention is also applicable to a case of a backlight which illuminates the LC panel from the rear face side of the LC panel.

Figure 3:
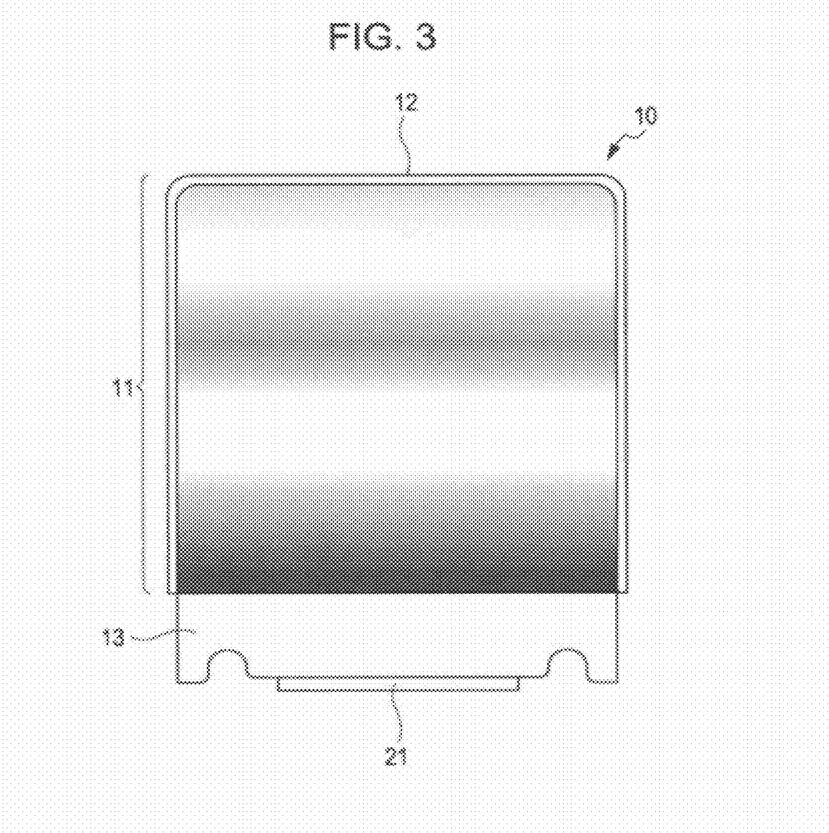
FIG. 3 is a diagram illustrating a transverse unevenness as a light unevenness in the transparent display.

FIG. 3 is a diagram illustrating a transverse unevenness as a kind of light unevenness in the transparent display.

As described above, a diffusion plate or the like which overlaps the display image plane may not be used in the transparent display. For this reason, if the entire display image plane performs, for example, a white solid display with the same brightness, even when the entire image plane of the display section 11 is uniformly illuminated by the light from the light source in the light guide plate 12, the transverse unevenness is generated as shown in the figure. A factor of the generation of this transverse unevenness lies in that since the light guide plate 12 has a remarkably different structure, a part where the light is collected and a part where the light is not collected based on the reflection of light are generated.

An element 21 shown in FIG. 3 represents a flexible printed circuit board which gives signals for driving the LC panel.

Figure 4:
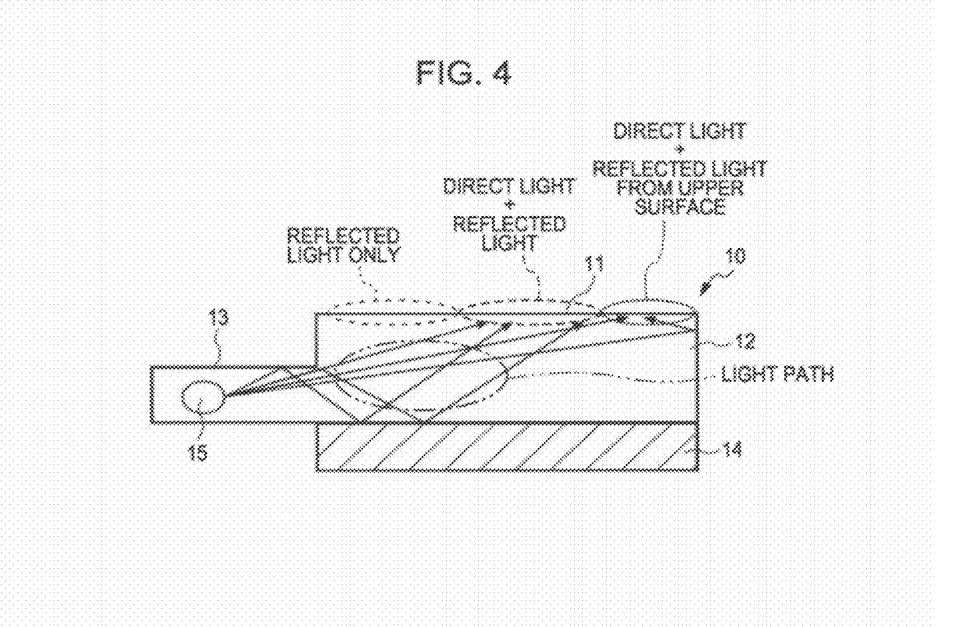
FIG. 4 is a schematic diagram illustrating a light guide state in a light guide plate, which is thought as a factor of the transverse unevenness.

FIG. 4 shows a schematic light guide state in the light guide plate 12, which is thought as the factor of the transverse unevenness. This light guide plate 12 is shown schematically for description, and shapes of its detailed parts or ratios of the respective parts are different from those in an actual one. As described above, the LC panel 14 is disposed in the back of the light guide plate 12 of the LC module 10. The light guide plate 12 constituting a portion of the LC module 10, as described above, is connected to the display section 11, and has the step section 13 lower than the image plane position by one step. A light source 15 is arranged inside the step section 13. In this embodiment, one or more light emitting diodes (LEDs) are used as the light source 15.

As can be seen from FIG. 4, the light illuminated to the display section 11 side from the light source 15 inside the step section 13 includes a direct light which directly reaches the surface of the display section 11 in the light guide plate 12, and a reflected light which reaches the surface through one or more reflections on the inner surfaces of the light guide plate. Thereby, as shown in FIG. 3, the amount of light is different in the position of the longitudinal direction of the display image plane. This is estimated as the factor of the transverse unevenness described above.

For example, the lower end part of the light guide plate surface close to the light source is not reached by the direct light from the light source but by the reflected light only, and thus is dark. In the step section 13, a part which is reached by both the reflected light and the direct light is brighter than a part which is reached by the reflected light only. A part is also bright which is reached by the direct light and a light reflected from the upper end surface of the light guide plate. An intensity of the reflected light is varied by the surface treatment of the upper end surface in the part which is reached by the direct light and the reflected light from the upper end surface of the light guide plate, and the part may be thereby brighter or darker than the part which is reached by both the reflected light and the direct light in the step section 13. Actually, there are many light paths which undergo reflections several times, so it is not as simple as the above description. Anyway, as the factor of the transverse unevenness which is an issue of the present invention, the step difference in the light guide plate 12 is believed to be a prime factor.

Figure 5:
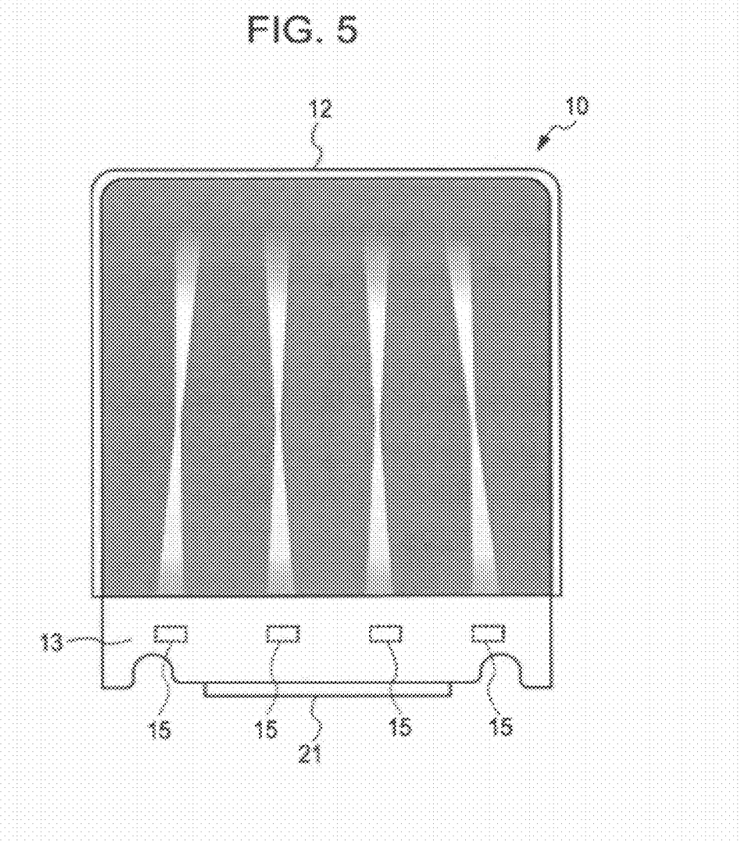
FIG. 5 is a diagram illustrating a longitudinal line as a light unevenness in the transparent display.

FIG. 5 is a diagram illustrating a longitudinal line as another light unevenness in the transparent display. This longitudinal line is thought to be generated by the light, emitted from the respective light sources 15 (in this example, four light sources), directly reaching the surface of the light guide plate 12. That is to say, the light emitted from the light sources may not be sufficiently diffused, and, in this state, the light travels in the light guide plate 12, so this causes the longitudinal lines. The light guide plate 12 itself is transparent, and thus is not really contribute to the diffusion of the light. For this reason, as shown in FIG. 5, the light paths are seen as they are, and these form the light unevenness of the longitudinal lines.

Figure 6:
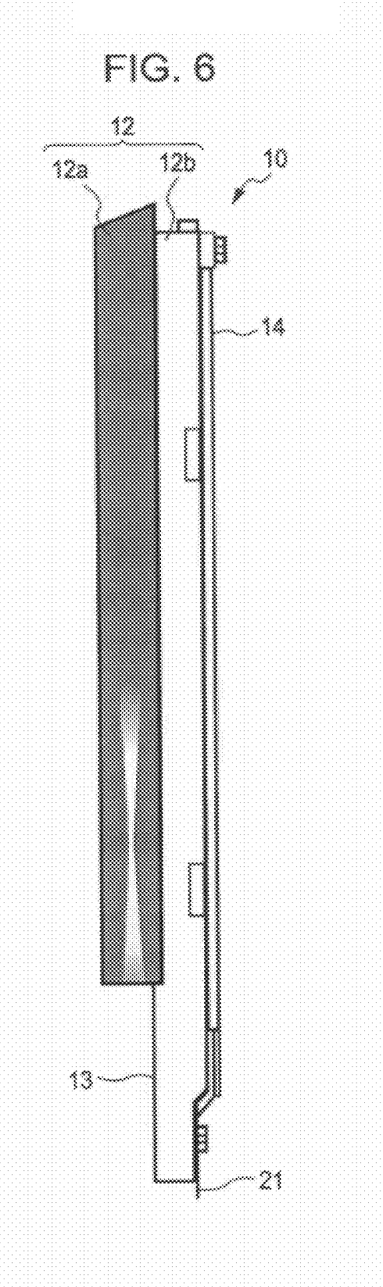
FIG. 6 is a diagram illustrating a light source unevenness as another light unevenness in the transparent display.

FIG. 6 is a diagram illustrating a source light unevenness as another light unevenness in the transparent display. This figure shows a side view of the LC module 10. The light guide plate 12 overlapping the LC panel 14 includes an outer magnifying section 12a and an inner installing section 12b. The magnifying section 12a is a part which constitutes the display image plane. The installing section 12b is a part for installing the housing 30 (that is, a housing part in the rear face side). In this embodiment, the magnifying section 12a and the installing section 12b are formed as a single body and are made of the same transparent material. The lower end side of the installing section 12b extends downwards further than the magnifying section 12a so as to form the step section 13.

A factor of the source light unevenness is substantially the same as that of the longitudinal line described above. In other words, it is the factor for the light emitted from the light source to be directly seen in the lateral end surface without the sufficient diffusion of the light from the light source in the light guide plate 12. If the lateral end surface of the light guide plate 12 can be hidden, the light unevenness is not problematic any longer; however, like this embodiment, there is a case where the end surface of the light guide plate 12 may not be hidden in terms of design.

The light unevenness is problematic in this case.

As above, the light unevenness caused by various factors has much influence on the visual quality of the LCD, and it is needless to say that the entire image plane with uniform brightness is preferable.

Methods that the transparent display is implemented and the light unevenness is reduced include a method that an optical analysis is made and patterns for diffusing light are added to the light guide plate which protects the LCD, and the like. The optical analysis costs a lot, and furthermore the transparency of the display device is much influenced by light diffusion.

Planarization of the light guide plate 12 by removal of the step from the light guide plate 12 can solve the transverse unevenness. However, if the step difference is removed from the light guide plate 12, the cabinet (the upper end of the member constituting the operation section in this example) for hiding the light source arranged in the step section 13 protrudes forward further than the display surface, and thus a step happens oppositely in appearance of the terminal.

In addition, a method or the like is considered that the step of the light guide plate 12 is removed, and a place desired to be hidden under the light guide plate 12 is not hidden in the cabinet but is only colored. In this case, however, in terms of cost, or the necessity of accordance of colors with other parts, the method may be difficult to actually implement.

Hereinafter, diffusion mechanisms which diffuse light from the light source for improving the light unevenness will be described.

Figure 7A:
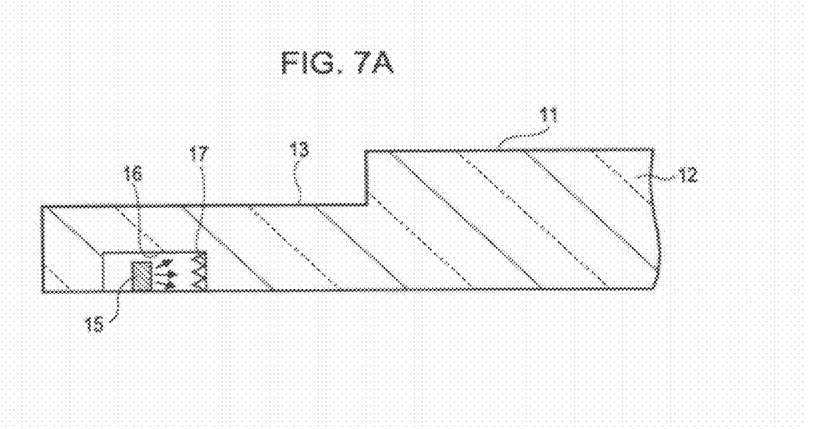
FIG. 7A is a sectional view seen from the arrow VIIA-VIIA in FIG. 7B.
Figure 7B:
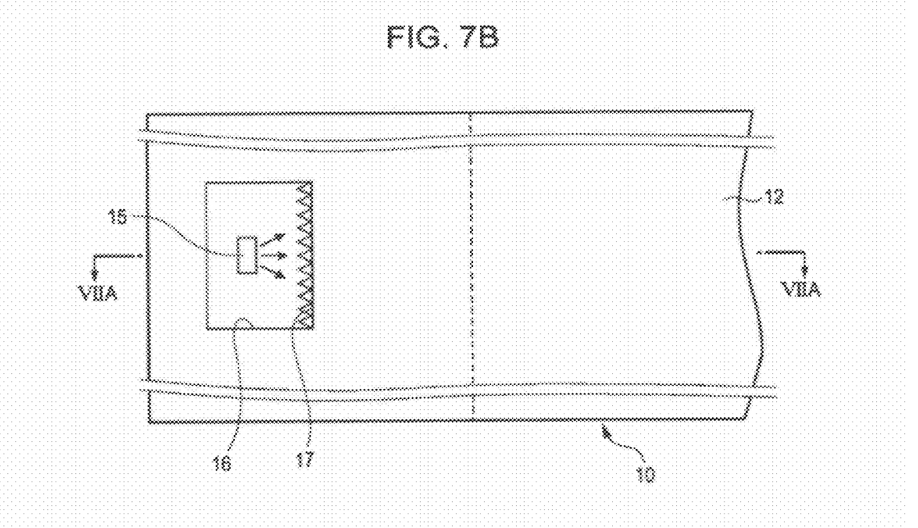
FIG. 7B is a diagram where the step section side of the light guide plate is seen from the rear face.

FIG. 7 is a diagram illustrating a first embodiment of the present invention. FIG. 7B is a diagram where the step section 13 side of the light guide plate 12 is seen from the rear face, and FIG. 7A is a sectional view seen from the arrow VIIA-VIIA therein. In the example in the figure, an LED as the light source 15 is disposed in a concave section 16 provided in the step section 13 of the light guide plate 12, and at least an inner wall surface 17 on which the light is incident undergoes a surface texturing. The surface texturing refers to a processing where patterns are added to surfaces of processed materials, for example, a processing for adding minute asperity such as a leather pattern, tree texture, rock texture, sand texture, pear-skin finish, cloth texture, geometric pattern or the like. A method can be also considered that a diffusion plate is attached to the associated wall surface. However, in consideration of cost of the diffusion plate, or misalignment at the time of the attachment, it is favorable to directly process a surface of a material such as acryl or the like so as to be formed with the member as a single body. The light emitted from the light source 15 is incident on the wall surface where the surface texturing is performed, and thereby the incident light can be diffused. Although the concave section 16 is formed in the rear face side of the light guide plate 12 in this embodiment, it may be formed in the front face side thereof. Alternatively, a through-hole which penetrates through the light guide plate from the front face side to the rear face side is also good. In the case of the concave section 16 formed in the front face side, or the through-hole, a light blocking component is independently formed in the front face side.

Figure 8A:
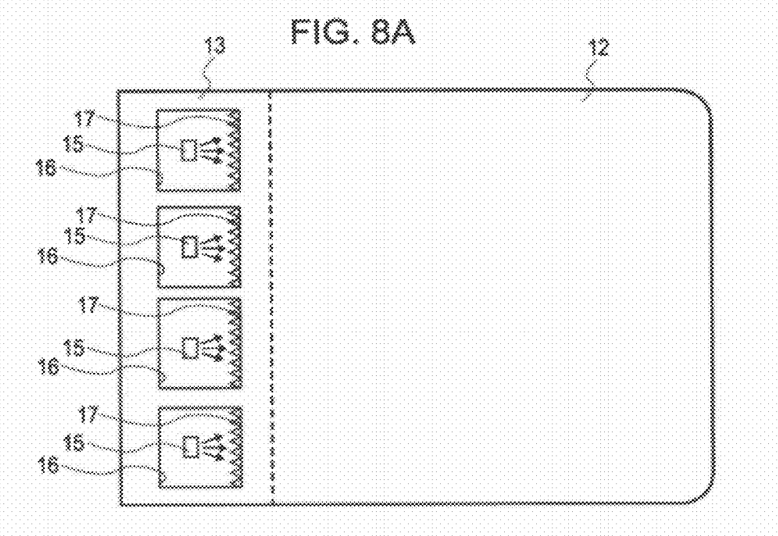
FIG. 8A and FIG. 8B are diagrams illustrating modifications of the first embodiment when there is a plurality of light sources.
Figure 8B:
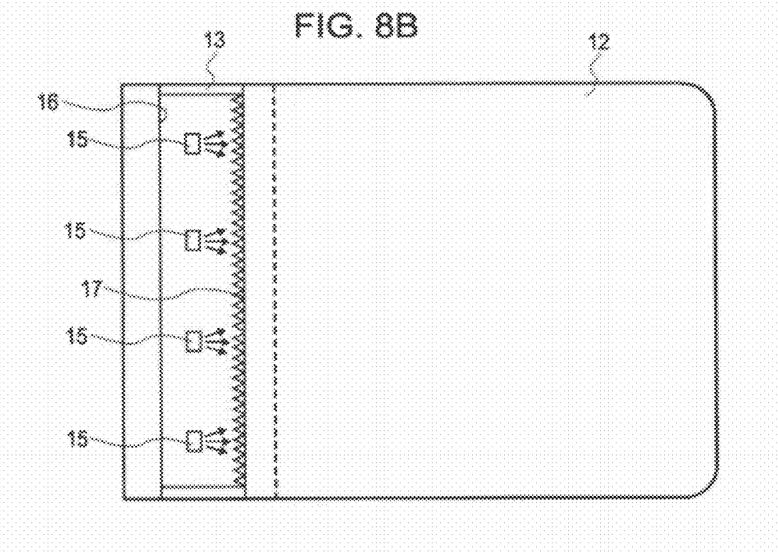

FIGS. 8A and 8B show modifications of the first embodiment when there is a plurality of light sources. The example in FIG. 8A shows that a plurality of concave sections 16 are formed one to one with respect to the plurality of light sources 15 (four light sources in this example). The example in FIG. 8B shows that a single concave portion 16 is shared with the plurality of light sources 15.

Figure 9A:
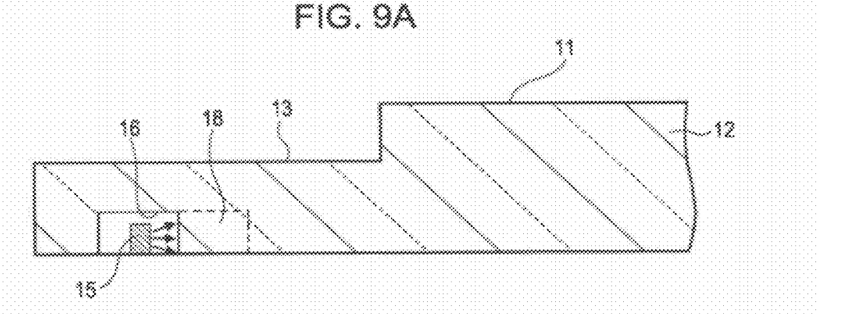
FIG. 9A is a sectional view seen from the arrow IXA-IXA in FIG. 9B.
Figure 9B:
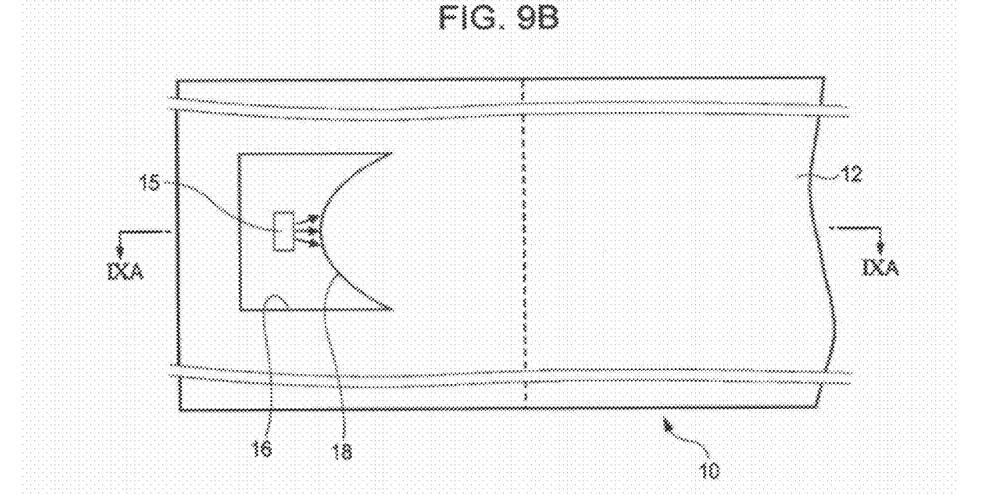
FIG. 9B is a diagram where the step section side of the light guide plate is seen from the rear face.

FIG. 9 is a diagram illustrating a second embodiment of the present invention. In this example, an LED as the light source 15 is disposed in a concave section 16 provided in the step section 13 of the transparent panel member 12, and at least an inner wall surface 18 on which the light is incident is curved with a shape protruding toward the light source 15. Alternatively, it may be curved with a shape retreating from the light source 15. The light emitted from the light source 15 is incident on this curved wall surface, and thus the incident light can be diffused.

Figure 10:
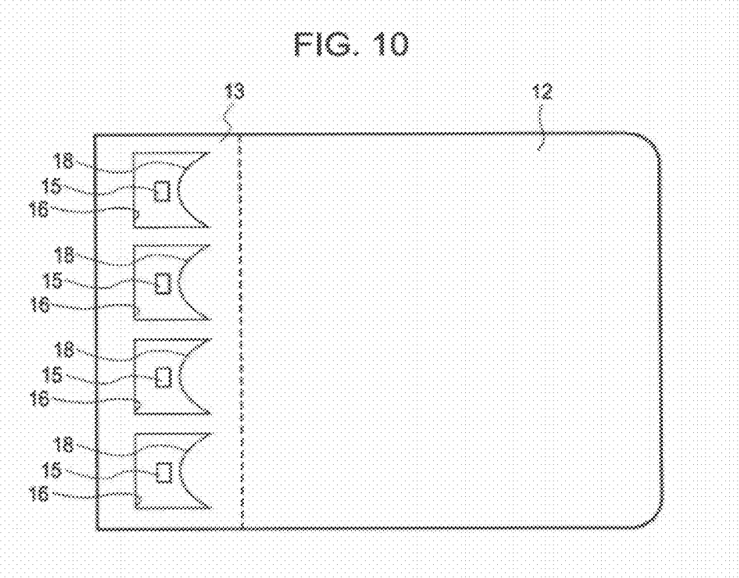
FIG. 10 is a diagram illustrating a modification of the second embodiment when there is a plurality of light sources.

FIG. 10 shows a modification of the second embodiment when there is a plurality of light sources. In this example, a plurality of concave sections 16 are formed one to one with respect to a plurality of light sources 15.

Figure 11A:
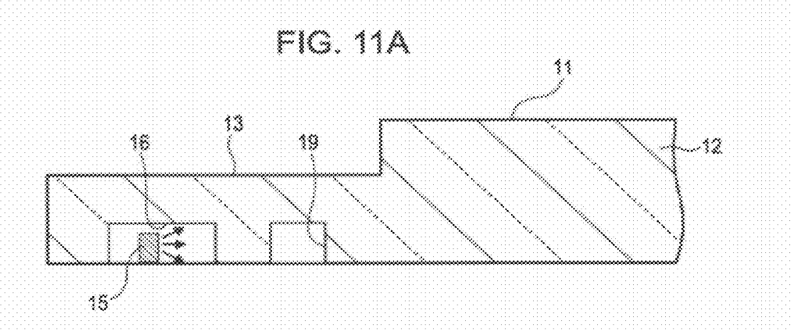
FIG. 11A is a sectional view seen from the arrow XIA-XIA in FIG. 11B.
Figure 11B:
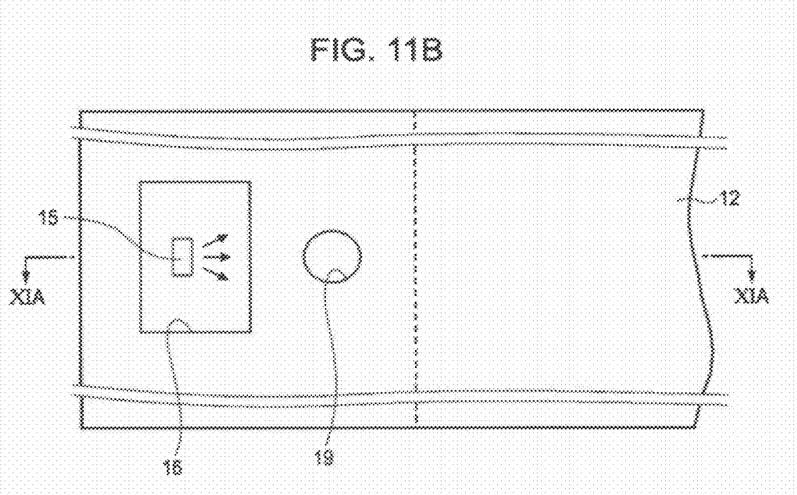
FIG. 11B is a diagram where the step section side of the light guide plate is seen from the rear face.

FIG. 11 is a diagram illustrating a third embodiment of the present invention. FIG. 11B is a diagram where the step section 13 side of the light guide plate 12 is seen from the rear face, and FIG. 11A is a sectional view seen from the arrow XIA-XIA therein. In this example, a cylindrical cavity 19 forming a cylindrical boundary face is arranged in front of the concave section 16 of the step section 13, in a direction of the light emitted from the light source 15 disposed therein. The light from the light source 15 is incident on this cylindrical boundary face, and thus the incident light can be diffused.

Figure 12:
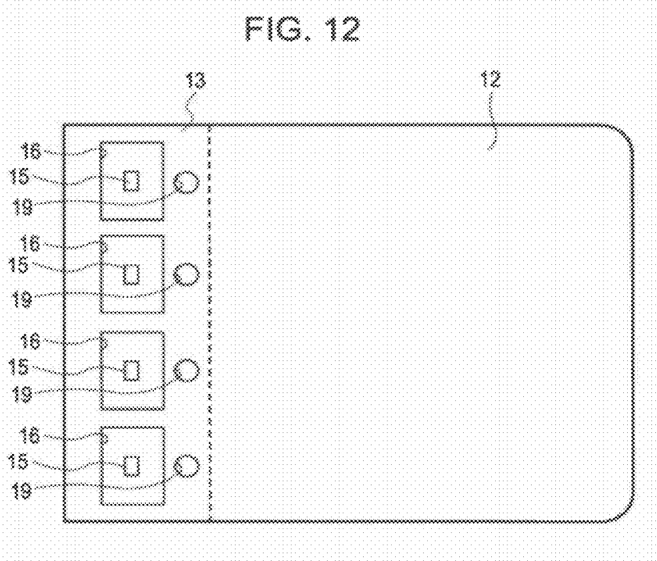
FIG. 12 is a diagram illustrating a modification of the third embodiment when there is a plurality of light sources.

FIG. 12 shows a modification of the third embodiment when there is a plurality of light sources. In this example, the cylindrical cavities 19 are arranged in front of the plurality of light sources 15, respectively.

Figure 13A:
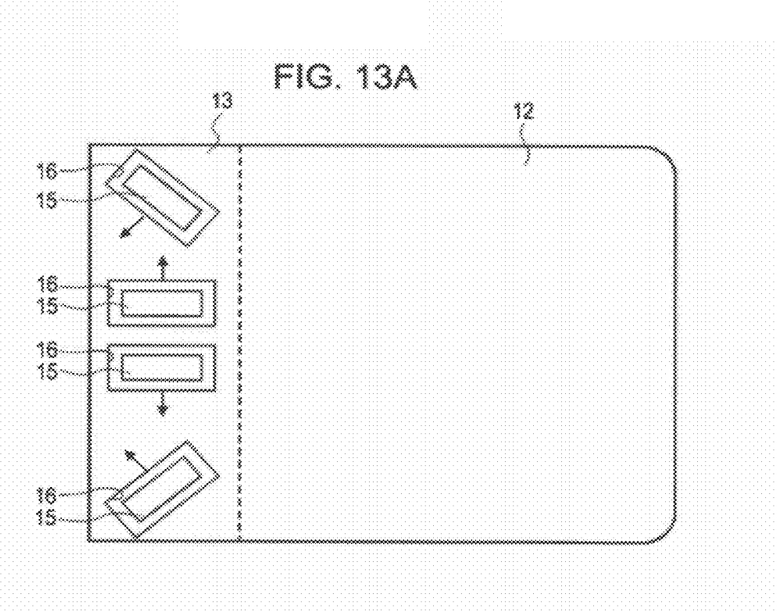
FIGS. 13A and FIG. 13B are diagrams illustrating a fourth embodiment of the present invention.
Figure 13B:
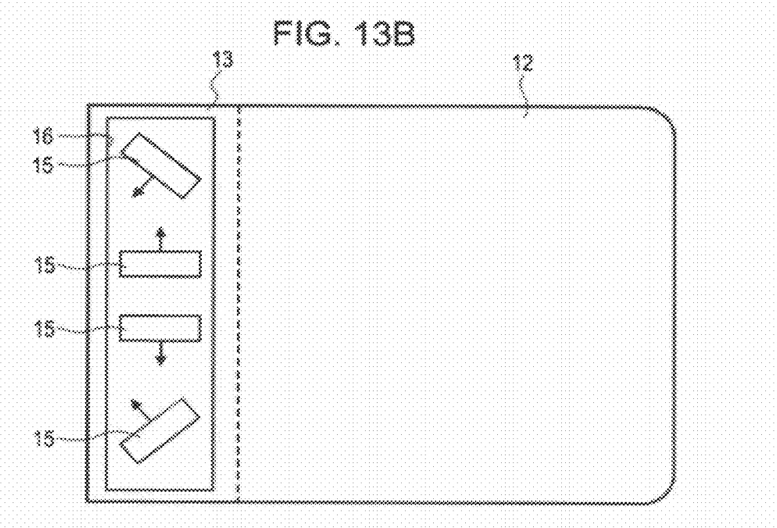

FIG. 13 is a diagram illustrating a fourth embodiment of the present invention. In this embodiment, a plurality of light sources 15 are disposed in a plurality of concave sections 16 provided in the step section, respectively, and directions of light emitted from the plurality of light sources 15 are different from each other. Thereby, the light from the light sources 15 can be diffused. Also, in this configuration, the directions of the light emitted from the plurality of light sources 15 are directions other than a direction directing to the display section. The arrangement of the plurality of light sources 15 and the emitted directions of the light are bilaterally symmetric. For example, if a direction originally directing to the display section 11 is taken as a reference (0 degrees), of four light sources 15 in this embodiment, two inner light sources 15 are tilted outwards by 90 degrees, and two outer light sources 15 are tilted inwards by 135 degrees. Thereby, it can be achieved that the brightness in the transverse direction can be balanced as well as the light from the light sources 15 can be diffused.

In this configuration, an opaque diffusion plate may not be sufficiently used in implementing the transparent display, and thus the light unevenness is reduced at the expense of the amount of light to some degree.

Figure 14A:
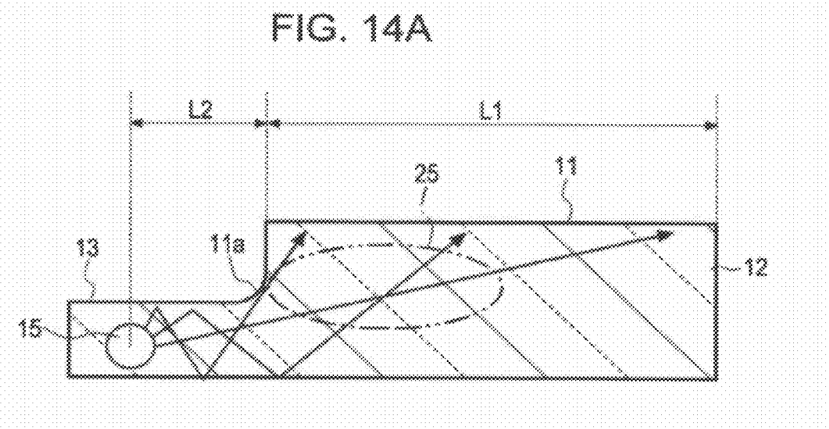
FIG. 14A and FIG. 14B are diagrams illustrating a fifth embodiment of the present invention.

FIG. 14 is a diagram illustrating a fifth embodiment of the present invention. In the example shown in FIG. 14A, an R section 11a as a diffusion mechanism is formed through an R processing at a place where the step section 13 of the light guide plate 12 begins to erect toward the display section 11. The length L1 of the display section 11 in the longitudinal direction and the length L2 from the light source 15 to the erecting edge are the same as those of the case where the R section 11a is not present. This configuration enables the light from the light source 15 to be easily guided to the lower end part 25 of the display section 11. Thereby, the transverse unevenness described in FIG. 3 is improved. The light source 15 is arranged so as to be close to the display section 11, resulting in increasing the amount of light reaching the lower part of the image plane. However, if the light source 15 is not to be directly seen from the appearance surface (display image plane), the length L2 may be more than a certain distance. Therefore, a position of the light source 15 may be preferably defined in consideration of both conditions.

Figure 14B:
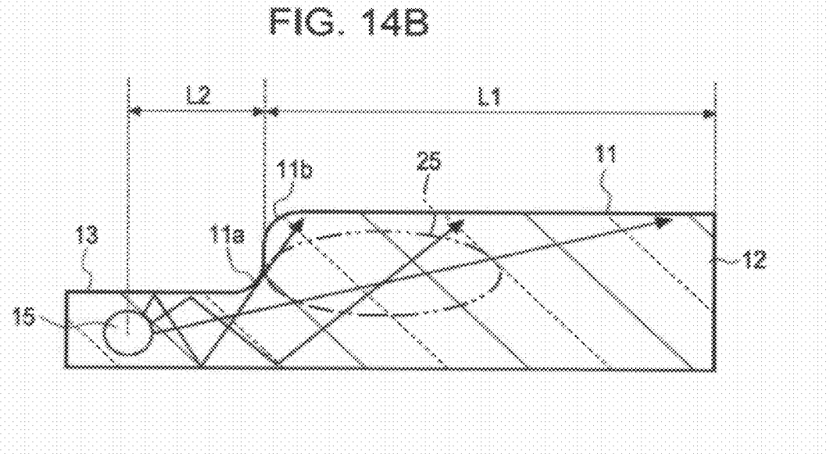

In the example shown in FIG. 14B, in addition to the R section 11a, an R section 11b is also formed at a place where the step section 13 of the light guide plate 12 finishes erecting toward the display section 11.

Figure 15:
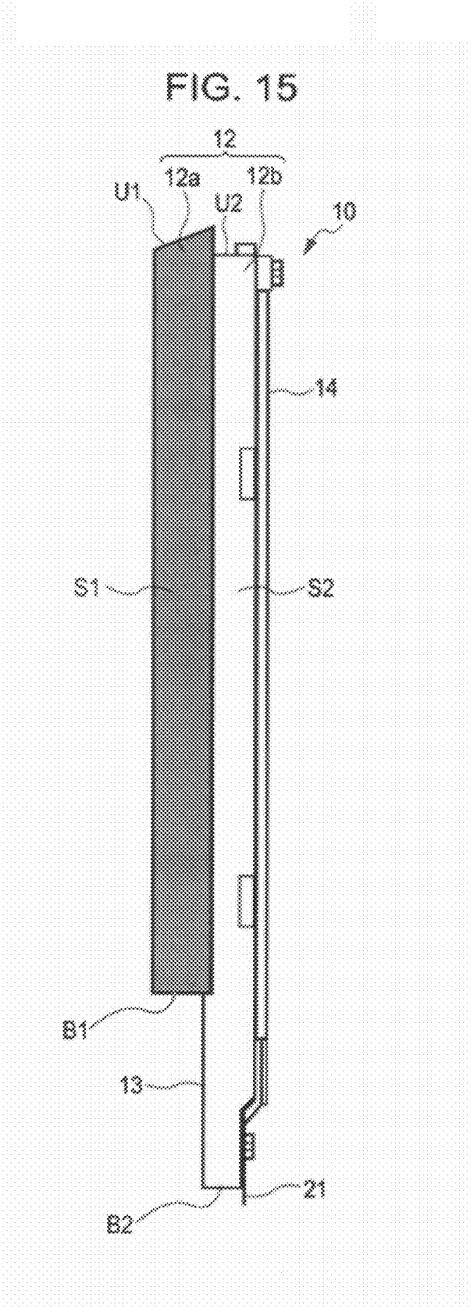
FIG. 15 is a diagram illustrating a sixth embodiment of the present invention.

FIG. 15 is a diagram illustrating a sixth embodiment of the present invention. The above-described surface texturing is performed for the inner wall of the concave section where the light source is disposed; however, it may be performed for parts other than the display section surface of the light guide plate 12 and its back (that is, parts causing no difficulty in displaying as the transparent display). These parts may include, for example, the upper end surfaces U1 and U2 of the light guide plate 12, its lateral end surfaces S1 and S2, and its lower end surfaces B1 and B2.

The light from the light source is diffused by these diffusion mechanisms, and thereby the above-described various kinds of light unevenness can be reduced.

As such, although the preferred embodiments of the present invention have been described, various modifications and alterations are possible in addition to the embodiments described above. For example, the above-described embodiments and modifications may adopt possible combinations of two or more arbitrary ones. For example, the surface texturing may be performed for the curved section 18 shown in FIG. 9, or for the wall surface of the cylindrical cavity 19 shown in FIG. 11. The cylindrical cavity 19 shown in FIG. 11 may be provided in the display section side of the concave sections 16 in FIGS. 7 and 9. The R section shown in FIG. 14 may be used along with all the other embodiments. The configuration shown in FIG. 15 may be also used along with all the other embodiments.

Although, in only the configuration of the concave section 16, its whole periphery has been surrounded by the inner wall, a portion thereof may be open to outside.

The portable telephone terminal has been exemplified by the so-called straight type only; however, the present invention is applicable to a folder type or a slide type terminal constituted by an upper housing and a lower housing. In this case, one housing (for example, the upper housing) may be provided with the transparent display.

The present application contains subject matter related to that disclosed in Japanese Priority Patent Application JP 2009-259506 filed in the Japan Patent Office on Nov. 13, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal module, comprising:
a liquid crystal panel;
a transparent panel member configured to include a display section constituting a display image plane while overlapping the liquid crystal panel, and a step section connected to the display section and lower than an image plane position by one step;
at least one light source disposed in the step section of the transparent panel member; and
a diffusion mechanism including a surface texturing provided on at least one lateral face of the display section of the transparent panel member, and diffusing light from the light source.

2. The liquid crystal module according to claim 1, wherein the light source is disposed in a concave section provided in the step section, and the diffusion mechanism includes that a surface texturing is provided on at least a face of the concave section where light from the light source is incident.

3. The liquid crystal module according to claim 1, wherein the light source is disposed in a concave section provided in the step section, and the diffusion mechanism includes that at least a face of the concave section where light from the light source is incident is curved.

4. The liquid crystal module, according to claim 1, wherein a plurality of light sources as the light source is disposed in a plurality of concave sections provided in the step section, respectively, and, the diffusion mechanism includes that directions of light emitted from the plurality of light sources are different from each other.

5. The liquid crystal module according to claim 4, wherein directions of light emitted from the plurality of light sources are directions other than a direction directing to the display section.

6. The liquid crystal module according to claim 4, wherein the arrangement of the plurality of light sources and emitted directions of light are bilaterally symmetric.

7. The liquid crystal module according to claim 1, wherein the light source is disposed in a concave section provided in the step section, and the diffusion mechanism includes that at least a cylindrical boundary face is formed in front of the concave section in at least a direction of light emitted from the light source.

8. The liquid crystal module according to claim 1, wherein the diffusion mechanism includes that an R section is formed at a place where the step section of the transparent panel member begins to erect toward the display section.

9. The liquid crystal module according to claim 8, wherein the diffusion mechanism further includes that an R section is formed at a place where the step section of the transparent panel member finishes erecting toward the display section.

10. The liquid crystal module according to claim 1, wherein the liquid crystal panel adopts a polymer dispersed liquid crystal.

11. An electronic device using the liquid crystal module as a display device according to any one of claims 1 to 3 and 4 to 10, comprising a rear face area of a housing, corresponding to the display section, transparent or empty.

* * * * *